United States Patent [19]

Erwin

[11] Patent Number: 4,608,484

[45] Date of Patent: Aug. 26, 1986

[54] POSTAGE METER

[75] Inventor: Timothy R. Erwin, West Redding, Conn.

[73] Assignee: Pitney Bowes Inc., Stamford, Conn.

[21] Appl. No.: 701,834

[22] Filed: Feb. 14, 1985

[51] Int. Cl.[4] .......................... B41F 1/06; G06F 1/106

[52] U.S. Cl. .................................... 235/101; 101/320; 101/416 R

[58] Field of Search ................ 235/101; 101/305, 314, 101/320, 321, 327, 348, 349, 363, 297, 416 R

[56] References Cited

U.S. PATENT DOCUMENTS 3,069,084 12/1962 Barkas et al. ....................... 235/137
3,143,963 8/1964 Schrempp ........................... 101/351
3,244,096 4/1966 Riley .................................... 101/297
3,310,139 3/1967 Buckley et al. .
4,165,688 8/1979 Leanna et al. ....................... 101/207
4,414,900 11/1983 Kraus et al. .......................... 101/363
4,437,405 3/1984 Haug .................................... 101/349
4,440,083 4/1984 Hooper ............................... 101/348

*Primary Examiner*—Benjamin R. Fuller
*Attorney, Agent, or Firm*—David E. Pitchenik; William D. Soltow, Jr.; Albert W. Schribner

[57] ABSTRACT

This invention discloses a structure for preventing unwanted migration of postage meter ink through the spaces separating various plastic components of the structure.

16 Claims, 5 Drawing Figures

Fig. 1.
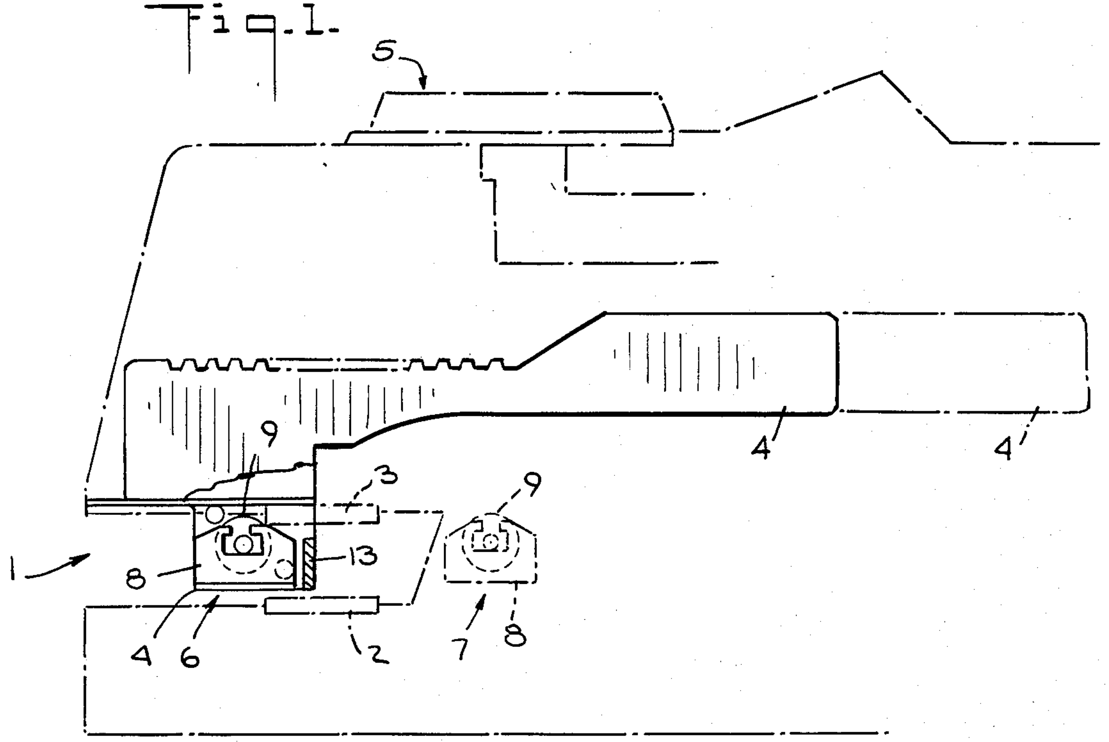
Fig. 3.
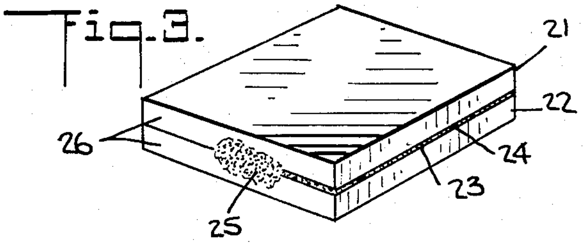
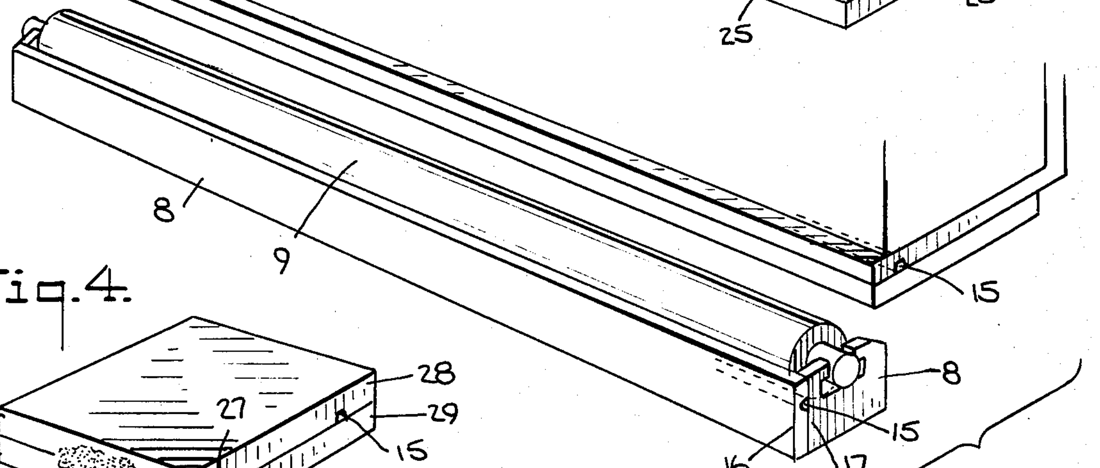
Fig. 2.
Fig. 4.
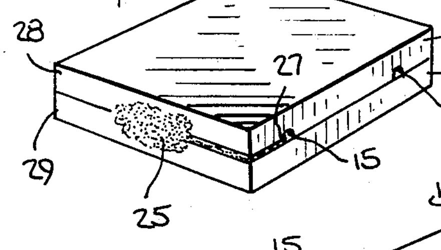
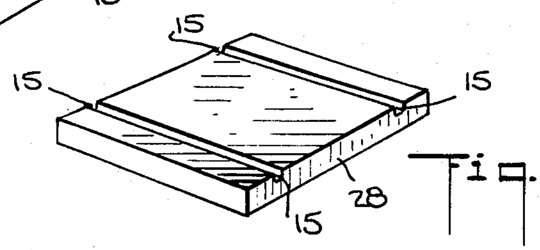
Fig. 5.

POSTAGE METER

This invention relates to an improved postage meter and, more specifically, to a device that reduces the wear and degradation of plastic components in these meters.

BACKGROUND OF THE INVENTION

It is customary to utilize a rotatably mounted inking member such as an ink roller in commercially available postage meters. The characters located on the printing die are inked by this roller just prior to printing. This roller is generally supported in brackets of an inking carriage which is mounted for multiple movement in the device. When a mailpiece is inserted into the meter, causing the meter to cycle, the inking roller is moved across the print characters. It is important that the inking be controlled so as not to unintentionally mark portions of the inserted mailpiece. In addition, ink contact with adjacent plastic components of the postage meter could reduce the mechanical properties of these components. Specifics of these types of postage meters are described in U.S. Pat. Nos. 3,244,096 and 4,412,491.

The ink used in postage meters is rather unique and formulated solely for use in postage meters. The ink by itself does not readily dry, but upon contact with paper or other substantially porous receptors it becomes fixed and relatively smudge-proof. The ink has a comparatively long shelf life and its evaporation rate is less than 2% weight loss in two months and less than 10% in 36 months. It has relatively little effect on metallic postage meter components such as those made from magnesium, brass, cadmium, chromium, steel or aluminum. However, because of its chemical components, the ink used in postage meters can have deleterious effects on plastic parts and components of the meter. The basic chemical composition of this type of ink is approximately 50% dioctyl phthalate and about 20% mono and dialkyl benzenes with a fluorescence material also present.

A serious problem encountered when using or changing ink-containing rollers is the contacting of this ink with adjacent plastic components. If the ink contacts a plastic structure having two surfaces in apparent contact, the ink will wick between the surfaces by capillary action and will spread through substantially the entire space between these surfaces. While the phenomenon of capillarity is usually associated with tubes of small diameters, it also occurs between adjacent surfaces having a small space therebetween. As mentioned, this phenomenon is most marked in capillary tubes, that is, tubes of very small diameter. Capillarity depends upon the forces created by surface tension (q.v.) and by wetting of the sides of the tube. In cases in which the forces of adhesion of the liquid to the solid (wetting) exceed the forces of cohesion within the liquid (surface tension), the surface of the liquid will be concave and the liquid will be drawn into the tube—that is, will rise about the hydrostatic level. This action is typified by water in clean glass tubes. In cases where the forces of cohesion exceed the forces of adhesion, the surface of the liquid will be convex, and the liquid will be repelled from the tube—that is, will fall below the hydrostatic level. This action is typified by water in greasy glass (where the adhesion is small) and by mercury in clean glass (where the cohesion is large). Familiar examples of capillary rise are the absorption of water in a sponge, ink in a blotter, or coffee in a lump of sugar, and the rise of kerosene or molten wax in a wick. This same effect occurs when the ink above described is in touch with surfaces in close proximity. Thus, when an operator changes the ink roller in a postage meter, he or she could unintentionally touch the adjacent plastic components with the roller. This causes, in many instances, this unwanted capillary effect on these plastic parts which eventually destroys or reduces their mechanical properties and causes damage to the meter.

Various non-leaking ink systems have been attempted in structures other than postage meters. These solutions, however, do not apply to postage meters in part because of the uniqueness of the ink required in postage meter use. Some of these devices are disclosed in U.S. Pat. Nos. 4,165,688; 4,414,900; 4,437,405 and 4,440,083. There is not known, however, an effective deterent to ink migration or contamination of the type described above relative to postage meters.

SUMMARY OF THE INVENTION

It is therefore an object of this invention to provide a postage meter devoid of the above-noted disadvantages.

It is another object of this invention to provide means for use adjacent an inking mechanism for a postage meter that minimizes ink contamination of adjacent plastic or synthetic structures.

It is a further object of this invention to provide plastic or synthetic means adjacent an inking mechanism in a postage meter that will have an extended useful life.

It is a further object of this invention to provide a structure that will minimize or eliminate ink capillary action between two adjacent surfaces.

Another object of this invention is to provide means for use in a postage meter that ensures that ink contamination of components be held to a very low level.

These and other objects of this invention are accomplished generally speaking by providing a novel postage meter comprising an inking station made up of an inking roller and components adjacent to said inking roller. This inking station contains an ink roller extending longitudinally across the lower portion of the postage meter. Positioned between this roller and the meter components above the roller is an ink capillary action blocking means. This blocking means comprises at least one groove in at least one surface of two adjacent surfaces. Generally, plastic or synthetic material formed components in a postage meter are positioned in virtual contact with each other separated by a miniscule space. It is this space that the ink will migrate into and flow throughout because of capillary action. To prevent this capillary flow, a groove or dam is positioned in at least one surface to interrupt and stop capillary action ink migration. This minimizes to a great extent ink contamination and resulting degradation of the affected plastic components. These components will be referred throughout this disclosure as "synthetically constructed" components. These will encompass plastic, polymeric, or any other non-metallic components. The less unwanted ink migration permitted in the postage meter, the less degradation of plastic and synthetic components could take place. Many of the necessary chemical components of postage meter ink are offensive to synthetic materials such as polycarbonates, polyurethanes, polyamides and other polymers. Since a major portion of the postage meter is constructed of synthetic materials, a substantial savings can be achieved if the useful life of these components can be extended substantially.

As noted earlier, postage meter inks, because of their uniqueness, readily creep through or wick between surfaces of adjacent components. This unwanted spread of ink contaminates can be prevented by providing a a groove (or capillary dam) in at least one adjacent surface of the components. This groove extends longitudinally or laterally across substantially the entire surface affected. This groove breaks the capillary action of the ink causing its migration or movement to stop. This groove or migration dam can be used in any component adjacent to the ink roller or otherwise affected by unwanted ink migration. It has been found that this expedient is extremely effective and should substantially prolong the useful life of the affected plastic components.

BRIEF DESCRIPTION OF DRAWING

FIG. 1 is a side elevational view of a postage meter containing the ink migration dam of this invention.

FIG. 2 is a front plan view of the inking structure used in the present invention.

FIG. 3 is a side perspective view of an example of prior art components used in a postage meter.

FIG. 4 is a side perspective view of an example of two components adjacent the inking station of a postage meter containing the ink migration dam of this invention.

FIG. 5 is a side perspective view of an example of one inverted component of FIG. 5 containing the ink migration dam of this invention.

DESCRIPTION OF DRAWING AND PREFERRED EMBODIMENT OF THE INVENTION

In FIG. 1 of the drawings, a typical commercially available flat-bed postage meter is illustrated, an example of which is a Pitney Bowes' Model 5700 series meter. A printing station is provided comprising a recess 1, into which a mailpiece is inserted for postage impression. Specifics of this type of postage meter are described more fully in U.S. Pat. Nos. 3,244,096; 4,412,491; 3,069,084; 3,310,139 and 3,143,963. When a mailpiece is positioned in recess 1 properly so as to activate a switch (not shown), the inking roller moves across the printing characters and then platen 2 is caused to move rapidly upward to force the mailpiece against a printing head or die 3 containing the raised print postage characters so as to be marked as desired. In the Model 5700 series, the movement of the device, the setting of postage values and the memory units are all controlled mechanically when the operator utilizes console keyboard 5.

The print characters contained on the printing die 3 are inked just prior to printing. A rotatably mounted inking member such as an ink roller 9 is supported in the brackets of an inking carriage 4, which is mounted for left and right movement in the device, that is, from the front of the device toward the back of the device. At the start of the printing cycle, the carriage 4 is in its rest or home position 6, and when the mailpiece is inserted and the printing cycle begun, the carriage 4 is automatically reciprocated to the right position 7. As the carriage thus moves, roller 9 is wiped across the print characters on printing die 3 and the characters are thus inked. When the carriage is in its retracted position 7, platen 2 moves the mailpiece upward against the printing die 3 to place the postage values thereupon. After mailpiece removal, the carriage 4 is automatically moved back to its home position 6. The drive for automatically producing this movement is not shown here, but is adequately described in the patents above mentioned.

The ink rollers heretofore used in these devices are designed to be disposable when the ink supply which they contain has been exhausted to the point where the postage impressions become faint or illegible. The operator currently determines this by inspection of the quality of the postage impressions as time goes by. When the roller has reached the end of its useful life span, the operator then removes the spent roller by use of molded in handles.

When the roller has been removed, it is not uncommon for ink to be inadvertently smudged onto or contacted with adjacent plastic components such as carriage 4, housing 8 or other adjacent components such as that shown in FIG. 2.

The inking system of this invention comprises an inking cartridge. A housing 8 contains an inking roller 9 adapted to be rotatably mounted within the housing. Ink rollers 9 are typically comprised of porous resilient material containing a supply of ink, surrounding a central shaft which previously was mounted for rotation directly in the brackets of the movable carriage of the printing device. In this invention, the inking member is rotatably mounted within housing 8, which cartridge is then mounted for movement within the device by inserting the same into the movable carriage. Inking carriage 4 which moves into and out of the device during the printing cycle is, in this case, fitted with a tie bar 13 having end brackets not shown. Over piece 14 further houses roller 9 and is generally constructed of a synthetic or polymeric material such as polycarbonate. This structure 14 as well as all the other components adjacent the ink roller 9 can be easily contaminated with unwanted ink when the roller 9 is removed or changed. Structure 14 in addition to other components, is, of course, adjacent other surfaces having the same degree of tolerance or space between them. For purposes of this invention, the contact between adjacent surfaces will be referred to as "virtual contact", which means a minute space exists between said surfaces. It is in this space that the unwanted ink will migrate or move by capillary action through the surface of each component. To prevent or minimize this ink migration, ink dams or grooves 15 are provided in at least one surface as shown in FIG. 2. Grooves 15 may extend totally or partially across either or both the length or the width of a surface of the structure 14, or the structures shown in FIGS. 4 and 5. In this disclosure "at least partially across one dimension" will indicate at least one of the four sides of a rectangular structure or any side or periphery of any other structure. These grooves 15 may be used in plastic cartridge housing 8 or they may be used in overhousing 14 as shown in FIG. 2. In FIG. 2, ink roller 9 is shown in ink cartridge housing 8. Sides of housing 8 may be one ply or may be two plys, that is constructed of two layers 16 and 17 of material as shown. If two-ply construction is used, ink dams, grooves, or blocks 15 would be put in the surface of at least one face of the ply to prevent the ink from migrating beyond that point. Also, grooves 15 are used in overpiece 14 to prevent the ink from migrating between the space 18 separating layer 19 from layer or ply 20. In FIG. 3 two adjacent plastic components 21 and 22 typical of those found in prior art postage meters are illustrated for purposes of clarity of this invention. Here, space 23 between components 21 and 22 is filled with ink 24 which migrated from ink smudge 25 which may have inadvertently contacted front surface 26 of these components 21 and 22. Once postage meter ink contacts a flat surface or any other surface of adjacent components as 21 and 22 the nature of postage meter ink and capillary action will cause the ink to migrate into and through space 23. Components 21 and 22 are said to be in virtual contact or a small space 23 exists between them. In FIG. 4, the capillary dam 15 or groove 15 breaks the flow of ink caused by capillary action and the ink migration stops at that point. One or several grooves or dams 15 may be used in surfaces of layers or components 28 and 29 depending on the specific needs. In FIG. 4 two grooves or dams 15 are shown for purposes of clarity. As shown in FIG. 4, the flow of ink is stopped at point 27 where its capillary action migration is interrupted. These grooves 15 may be of any suitable size to prevent ink migration. In one embodiment grooves 15 were made $0.03^{R}\times 0.035$ high. They may be put continuously or discontinuously across the longitudinal axis or other axis of any synthetic component. The grooves are shown in the drawings as continuous and positioned along the lateral axis, however, as earlier mentioned, they may be positioned in any effective way. In FIG. 5 component 28 of FIG. 4 is inverted so that the grooves 15 are clearly illustrated. Component 29 of FIG. 4 could contain the grooves 15 rather than or in addition to component 28, if desired.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A postage meter comprising a meter housing, an interior metering assembly and an inking station, said inking station comprising an inking means and synthetic constructed components adjacent said inking means, at least one of said components containing an ink capillary action block in the form of at least one groove, said at least one groove being located at a portion of a first component that is in face to face virtual contact with a second component, said at least one groove being of sufficient dimensions so as to prevent migration by capillary action of postage meter ink beyond its position in said component.

2. The postage meter of claim 1 wherein said inking means is a roller extending laterally across the lower portion of said postage meter.

3. The postage meter of claim 1 wherein said inking means is a detachable roller.

4. The postage meter of claim 1 wherein said inking means is a detachable roller and at least one of said components is adjacent one portion of said roller.

5. The postage meter of claim 1 wherein said at least one groove is positioned close to the edge of the entire periphery of said component.

6. The postage meter of claim 1 wherein said at least one groove is positioned longitudinally through the face of at least one of said components.

7. The postage meter of claim 1 wherein said at least one groove is positioned laterally through the face of at least one of said components.

8. A postage meter comprising a meter housing, an interior metering assembly and an inking station, said inking station comprising an inking roller and synthetic constructed components adjacent thereto, said components having at least two surfaces in virtual contact, at least one of said surfaces containing an ink capillary action block in the form of at least one groove which extends at least partially across one dimension of said component, said at least one groove being of sufficient depth so as to prevent migration or movement of said ink beyond said at least one groove location in said component.

9. The postage meter of claim 8 wherein said inking means is a roller extending laterally across the lower portion of said postage meter.

10. The postage meter of claim 8 wherein said inking means is a detachable roller.

11. The postage meter of claim 8 wherein said inking means is a detachable roller and at least one of said components is adjacent one portion of said roller.

12. The postage meter of claim 8 wherein said at least one groove is positioned close to the edge of the entire periphery of at least one of said components.

13. The postage meter of claim 8 wherein said at least one groove is positioned longitudinally through the face of at least one of said components.

14. The postage meter of claim 8 wherein said at least one groove is positioned longitudinally through the face of at least one of said components.

15. A method for preventing the capillary flow of ink through a space between at least two surfaces in virtual contact within a postage meter, the postage meter comprises a meter housing, an interior metering assembly and an inking station, the inking station including an inking means and synthetic constructed components adjacent the inking means, the components having at least two surfaces in virtual contact, the method comprising the step of providing in at least one of said surfaces at least one groove of sufficient dimensions so as to prevent migration by capillary action of said ink beyond said at least one groove in said surface.

16. The method of claim 15 wherein the step includes positioning said at least one groove at least in part close to the edge of the entire periphery of said surface.

* * * * *